United States Patent [19]

Ogasawara

[11] 4,321,629
[45] Mar. 23, 1982

[54] IMAGE INFORMATION READING SYSTEM

[75] Inventor: Fumihoro Ogasawara, Kawasaki, Japan

[73] Assignee: Ricoh Company, Limited, Tokyo, Japan

[21] Appl. No.: 152,319

[22] Filed: May 22, 1980

[30] Foreign Application Priority Data

Jun. 5, 1979 [JP] Japan ................................ 54-69402

[51] Int. Cl.³ .......................... H04N 1/02; H04N 1/40
[52] U.S. Cl. ...................................... 358/294; 358/293
[58] Field of Search ............... 358/260, 280, 293, 294, 358/285

[56] References Cited

U.S. PATENT DOCUMENTS 4,004,079 1/1977 Boston ................................ 358/280

4,163,260 7/1979 Hisao et al. ......................... 358/261

Primary Examiner—Joseph A. Orsino, Jr.
Attorney, Agent, or Firm—Oblon, Fisher, Spivak, McClelland & Maier

[57] ABSTRACT

An image information reading system capable of reading image information for N/n lines by one main scanning, while moving a reading head in the main scanning direction, which comprises N light receiving elements arranged substantially in the subscanning direction. When the scanning line density is reduced to 1/n, the image information for n lines is successively subjected to a logic processing, out of the image information for N lines read simultaneously by N light receiving elements, so that the image information for N/n lines is taken out, while the subscanning speed is increased n times for reading image information.

6 Claims, 5 Drawing Figures

IMAGE INFORMATION READING SYSTEM

BACKGROUND OF THE INVENTION

The present invention relates to an image information reading system and more particularly to an image information reading system for performing read scanning of image information and reproducing the same appropriately in accordance with a selected scanning line density in facsimile apparatus or the like.

In a conventional image information reading system, main scanning is performed electronically by using a reading head in which self-scanning type light receiving elements are arranged in the main scanning direction for scanning one line, while subscanning is performed by moving the original document mechanically using a motor, whereby the read scanning of image information is carried out.

Therefore, in the conventional image information reading system, the original document has to be moved intermittently line by line or several lines at a time when performing the subscanning. This makes it difficult to sustain a stable reading operation.

More specifically, when the motor for subscanning is driven intermittently, the space between each read scanning line varies due to the inertia of the motor when it is started or stopped, so that main scanning is not always performed in a parallel manner and therefore image information is not reproduced appropriately.

The applicants of the present invention have proposed an inexpensive facsimile apparatus capable of performing the read and record scanning, with the above-mentioned conventional shortcomings eliminated, in U.S. patent application Ser. No. 967,834 filed Dec. 18, 1978, now abandoned and German patent application O.S.L. 2,854,845 filed Dec. 19, 1978.

Generally, in facsimile apparatus, in order to increase information transmission efficiency when image information is transmitted from a sending side to a receiving side, it is necessary to select a suitable scanning line density for each original document, depending upon the kind and quality of the image of each original document.

If the scanning line density is low, the image information between each read scanning line may be omitted and accurate image information may not be transmitted to the receiving side.

In order to eliminate such omissions of image information, it is necessary to perform the read scanning of image information with a high read scanning line density all the time, or, if the read scanning line density is set low, the image information for a plurality of lines has to be subjected to a logic processing.

However, when the above-mentioned methods are utilized in conventional image information reading apparatus, a memory means is required for storing the image information for the plurality of line readings to be output from the reading head, so that the image information reading apparatus becomes expensive.

SUMMARY OF THE INVENTION

It is therefore an object of the present invention to provide an image information reading system capable of outputting image information in accordance with a selected scanning line density, with the space between each scanning line made uniform.

In order to accomplish this object, in the present invention, a reading head comprises N light receiving elements arranged in the subscanning direction and when the scanning line density is reduced to 1/n, the image information for 1 to n bits is successively subjected to a logic processing and is converted to the image information for one bit, so that the image information for N/n bits is output from the image information for N bits in the subscanning direction, which is output from the reading head in accordance with a selected scanning line density.

According to the present invention, since N light receiving elements are arranged in the reading head in the subscanning direction thereof, there is no variation in the space between each scanning line and, furthermore, out of the image information for N bits in the subscanning direction, the image information for 1 to n bits is successively subjected to a logic processing in accordance with each selected scanning line density, and the image information is converted to the image information for one bit in order to obtain the image information for a predetermined number of lines in the subscanning direction. Therefore, the image information for a predetermined number of bits in the subscanning direction can be obtained in accordance with each selected scanning line density by the simple logic processing, without requiring a buffer memory for storing one line, unlike the conventional image information reading system.

DETAILED DESCRIPTION OF THE PREFERRED EMBODIMENT

Referring to FIG. 1 through FIG. 5, an embodiment of an image information reading system according to the present invention will now be explained. A reading head 1 (refer to FIGS. 1 and 2) of the image information reading system comprises a photodiode array in which 64 charge integration type light receiving elements are arranged in the subscanning direction. For the convenience of explanation, the operation of the image information reading system will be explained as to the two cases when the subscanning line density is 8 lines/mm and 4 lines/mm.

Figure 1:
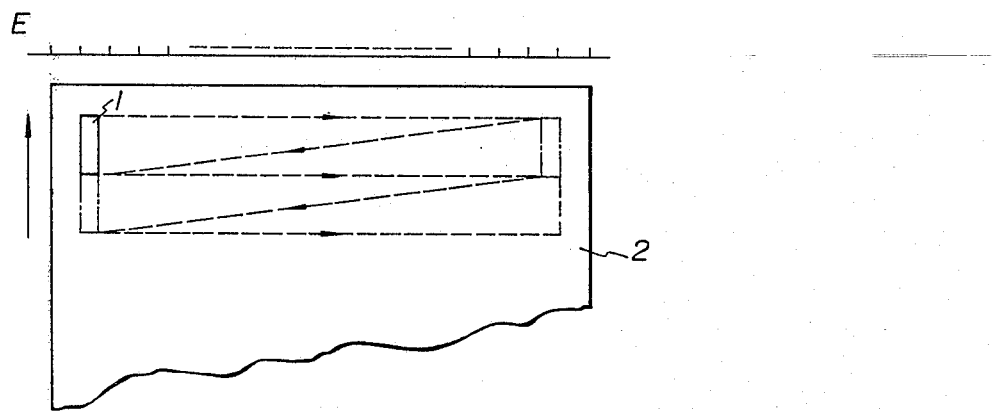
FIG. 1 is a diagram for explaining the read scanning operation at 4 lines/mm scanning line density of an embodiment of an image information reading system according to the present invention.
Figure 2:
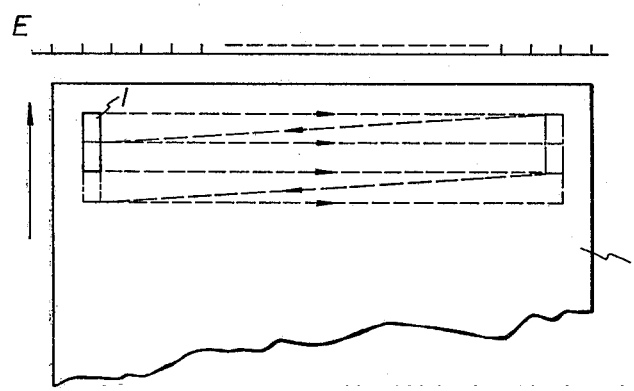
FIG. 2 is a diagram for explaining the read scanning operation at 8 lines/mm scanning line density of the embodiment of FIG. 1.

FIG. 1 and FIG. 2 are diagrams for explaining the read scanning operation of the present system at 4 lines/mm scanning line density and 8 lines/mm scanning line density, respectively.

In the reading head 1, 64 light receiving elements are arranged in a row the length of 8 mm in the subscanning direction. When clock pulses for reading image information are applied to the light receiving elements, the light receiving elements output serially the image information for 64 lines, namely the image information for 64 bits in the subscanning direction, in accordance with the applied clock pulses.

When the read scanning is performed at 4 lines/mm scanning line density, the reading head 1 is moved mechanically in the main scanning direction relative to an original document 2 as indicated by the short dashes lines in FIG. 1. In accordance with the movement of the reading head 1, an element clock E is generated at predetermined intervals in the main scanning direction, for instance, at ⅛ mm intervals. The reading head 1 generates serially the image information for 64 bits in the subscanning direction at the generation of each element clock E. As will be described in detail later, the image information for two bits at a time is subjected to a logic processing and is then converted to the image information for one bit, so that the image information for 32 bits is abstracted and is then stored in a buffer memory for the next transmission processing. When the first main scanning has been thus completed, the reading head 1 is returned to its start position for a second main scanning and, at the same time, the original document 2 is moved 8 mm in the direction of the solid line arrow as shown in FIG. 1. As a result, the reading head 1 is returned to its start position, taking a route indicated by the arrow of the short dashes lines.

In the case where the read scanning is performed at 8 lines/mm scanning line density, the image information for 32 bits is abstracted serially, in the same manner as mentioned above, from the image information for 64 bits in the subscanning direction, which generates in accordance with the generation of the element clock E at the first main scanning. And, the thus abstracted image information is stored in the above-mentioned buffer memory.

The image information for 32 bits can be abstracted from any bits of the 64 bit image information. However, for the following reasons, the photodiode array is constructed so as to be capable of abstracting the image information for the first 32 bits.

(1) The photodiode array is constructed in such a manner that the signal level of the first bit can be adjusted externally so that in order to make the signal level of each image information obtained uniform, it is better to abstract the image information from the first bit and succeeding bits.

(2) The construction of a circuit for generating data effective signals which will be described later can be simplified by abstracting the image information from the first bit and succeeding bits.

(3) By setting the starting position of the read scanning so as to abstract the image information from the first bit and succeeding bits, the original document can be set at the same position as in the case of the 4 lines/mm scanning line density.

When the first main scanning has been completed, the reading head 1 is returned to its start position as shown in FIG. 2 and, at the same time, the original document 2 is moved by 4 mm in the direction of the solid arrow. As a result, the reading head 1 is returned to its start position, taking the route indicated by the short dashes lines.

Figure 3:
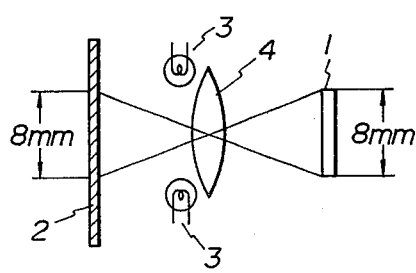
FIG. 3 is a diagrammatical view of the main portion of an optical system of a reading head for use in the embodiment of FIG. 1.

Referring to FIG. 3, there is shown an optical system for use with the reading system according to the present invention. In the figure, reference numeral 3 represents light sources for illumination of the original document and reference numeral 4 represents a lens for reading the original document. When the magnification of the lens 4 is 1, the image information for 0.125 mm of the original document in the subscanning direction thereof can be obtained from the light receiving element for one bit.

Figure 4:
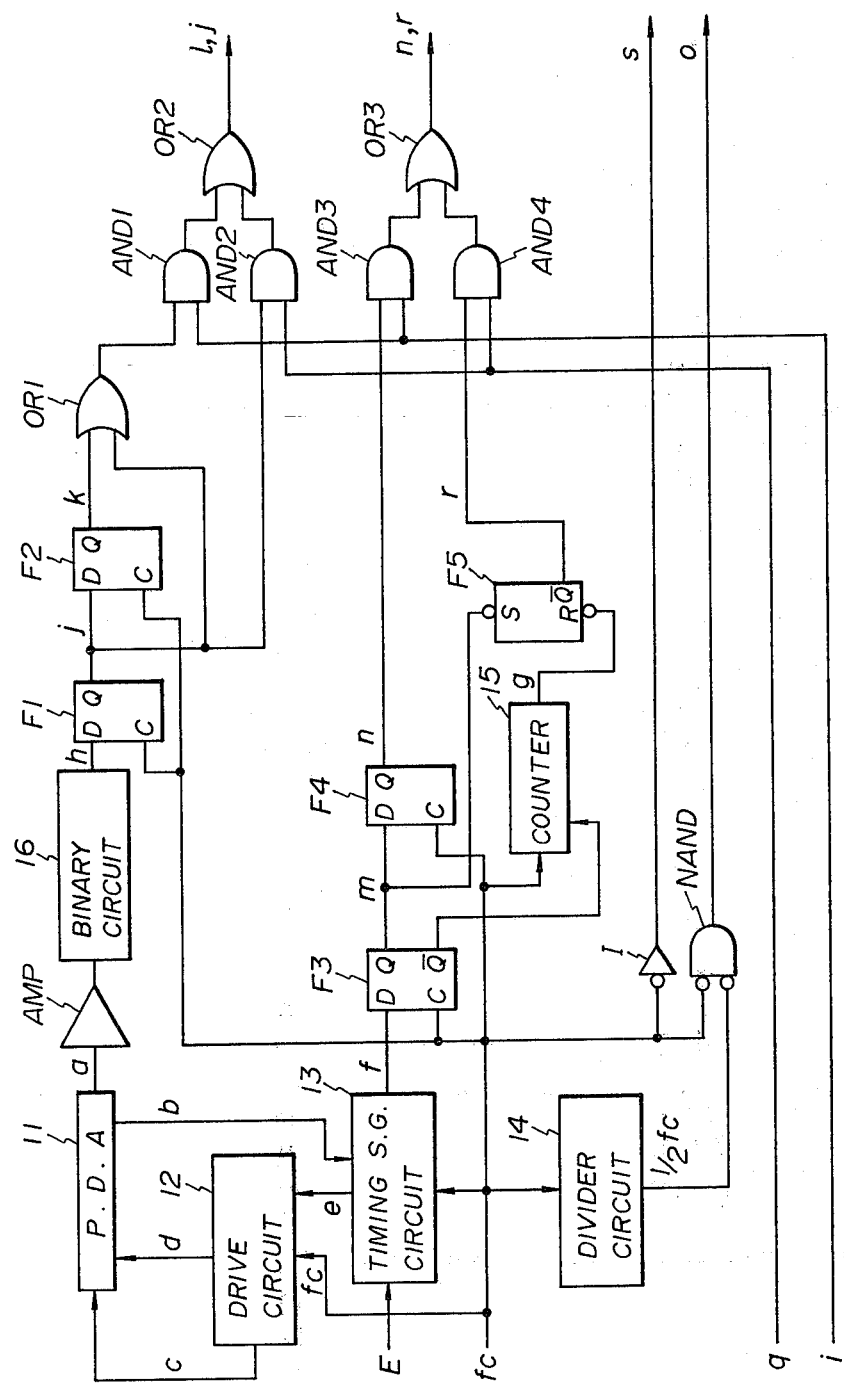
FIG. 4 is a block diagram of the embodiment of the image information reading system according to the present invention.

FIG. 4 shows a block diagram of the image information reading system for producing image information for 32 lines in the subscanning direction, which is capable of changing over the subscanning line density to 8 lines/mm or to 4 lines/mm. In the figure, reference numeral 11 represents a photodiode array capable of generating serially video signals a for 64 bits in synchronization with a reading clock, followed by generation of an end-of-strobe pulse b; reference numeral 12 represents a drive circuit of the photodiode array, which outputs a reading initiation signal c and a reading clock d; reference numeral 13 represents a timing signal generation circuit which outputs a drive signal e and a data effective signal f at a predetermined timing in accordance with the generation of an element clock E, a clock pulse fc and an end-of-strobe pulse b; reference numeral 14 represents a divider circuit for producing a clock pulse ½ fc whose frequency is a half of the frequency of the clock pulse fc; reference numeral 15 represents a counter for producing a carry pulse g when 32 of the clock pulses fc have been counted; and reference numeral 16 represents a binary circuit for producing an image signal h by making the video signal output from an amplifier AMP a binary signal. Reference numeral F1 to F4 represent D flip-flops for outputting from Q terminals the signals input to D terminals in synchronization with the rise of the clock pulse fc input to the C terminals. Reference numeral F5 represents an RS flip-flop; reference numerals OR1 to OR3, OR gates, reference numerals AND1 to AND4, AND gates, I, an inversion circuit; and NAND, a NAND gate.

In FIG. 4, there are not shown means for generating a 4 lines/mm setting signal i and an 8 lines/mm setting signal q. However, as is well known, for example, in the case of facsimile apparatus, those scanning line density setting signals i and q can be obtained from a line scanning density setting means capable of generating the signal i or q by the operator's selective operation of respective buttons disposed on an operation panel of the facsimile apparatus.

Figure 5:
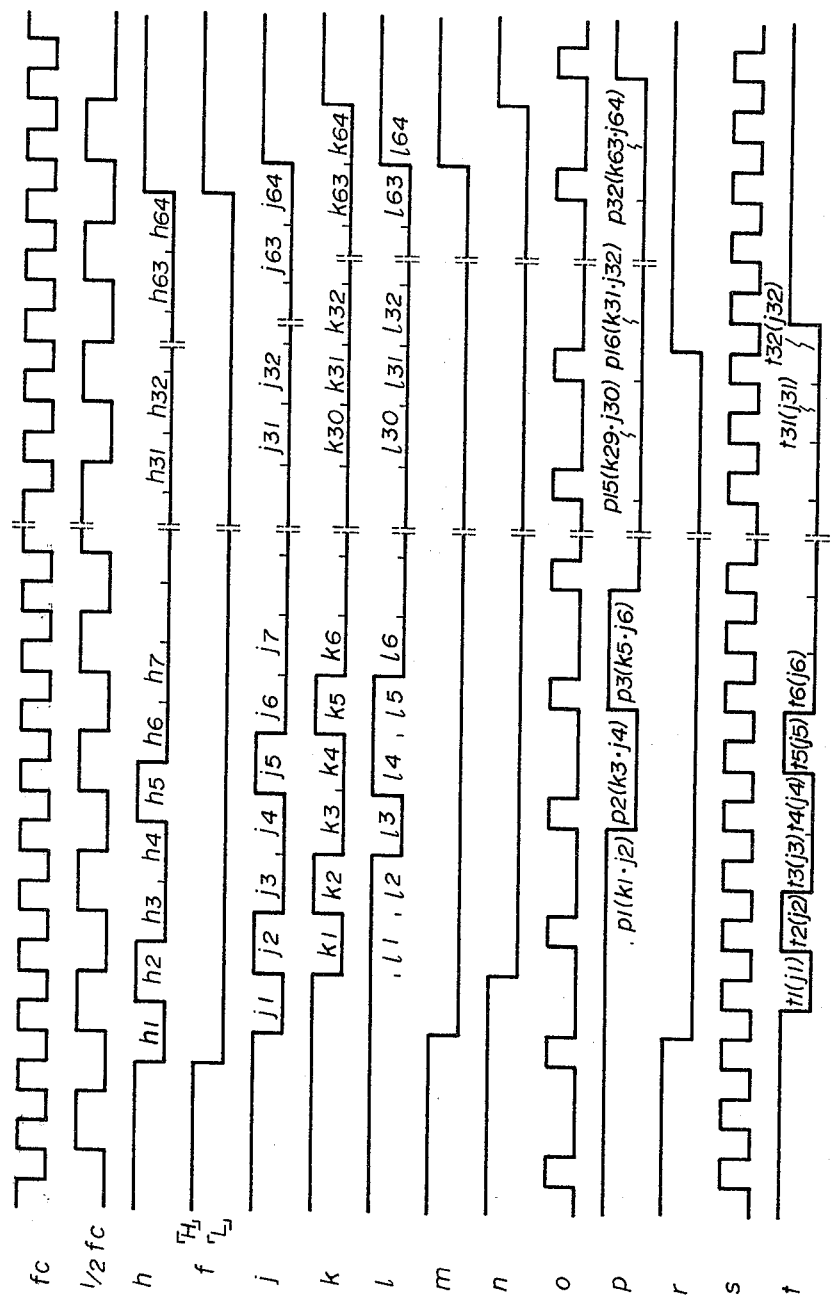
FIG. 5 is a time chart of the operation of the image information reading system according to the present invention.

Referring to the time chart of FIG. 5, the operation of the image information reading system will now be explained.

The clock pulse fc is always input to the system and accordingly the clock pulse ½ fc, whose frequency is half of that of the clock pulse fc, is always output from the divider circuit 14.

When the scanning line density is set at 4 lines/mm, AND gates AND1 and AND3 are opened by a 4 lines/mm setting signal i.

When the read scanning of the original document is started, the element clock E is detected and is input to the timing signal generation circuit 13 each time the reading head 1 reaches a predetermined main scanning position.

The timing signal generation circuit 13 produces the drive signal e from the clock pulse fc in accordance with the input of the element clock E thereto and outputs the drive signal e to the drive circuit 12.

The drive circuit 12 outputs the reading initiation signal c in accordance with the input of the drive circuit e and the reading clock d in accordance with the clock pulse fc to the photodiode array 11.

The photodiode array 11 outputs the video signal a bit by bit to an amplifier AMP, in synchronization with the reading clock d. The video signal a is converted to a binary signal and to an image signal h by the binary circuit 16.

The timing signal generation circuit 13 outputs a data effective signal f which is set at a low level, that is, the "L" level, in accordance with the input of the element clock E.

The image signal h, which is output from the binary circuit 16 in synchronization with the fall of the clock pulse fc, is delayed by ½ bit in the flip-flop F1 and is output from the flip-flop F1 as an image signal j. The image signal j is input to a flip-flop F2 and is delayed by one bit in the flip-flop F2 and is then output from the flip-flop F2 as an image signal K in synchronization with the rise of the clock pulse fc.

The image signal j and the image signal k, which is output with a one bit delay with respect to the image signal j, are input to an OR gate OR1 and are subjected to logical summation, and the logical sum is input to an OR gate OR2 through an AND gate AND1 which is opened at that time.

Therefore, from the OR gate OR2, there are output the image signal l for 64 bits which are obtained by subjecting the image signals for 64 bits in the subscanning direction, two bits at a time, to the logical summation.

On the other hand, the data effective signal f which is output from the timing signal generation circuit 13 is input to the flip-flop F3 and delayed by ½ bit there and is then input to the flip-flop F4 and delayed by one bit there and finally input to an OR gate OR3 through an AND gate AND3 which is opened at that time.

The flip-flop F3 outputs a data effective signal m which is set at the "L" level in synchronization with the image signal j. The flip-flop F4 outputs a data effective signal n which is set at the "L" level in synchronization with the image signal k.

Therefore, the OR gate OR3 outputs the data effective signal n which is set at the "L" level for 64 bits in synchronization with the image signal l.

Furthermore, the NAND gate NAND outputs a sampling pulse O for sampling the image signal l every other signal in accordance with the clock pulses fc and ½ fc.

As a result, by sampling image signal l by the sampling signal O and storing the image signal l in a buffer memory (not shown) during a data effective period in which the data effective signal n is at the "L" level, the image signal for 64 bits in the subscanning direction can be subjected to the logic processing two bits at a time, whereby the image signal p for 32 bits corresponding to 4 lines/mm scanning line density can be obtained.

When the scanning line density is set at 8 lines/mm, AND gates AND2 and AND4 are opened in accordance with a scanning line density setting signal q for setting the density at 8 lines/mm.

Therefore, the OR gate OR2 outputs the image signal j through the AND gate AND2.

A flip-flop F5 is set in synchronization with the fall of the data effective signal m and is reset by a carry pulse g which is output from a counter 15 when the counter 15 has counted 32 of the clock pulses fc. By inputting Q output r of the flip-flop F5 to the OR gate OR3 through the AND gate AND4, a data effective signal r which is set at the "L" level for 32 bits is output from the OR gate OR3 in synchronization with the image signal j.

The inversion circuit I outputs a sampling pulse S for taking out the image signal j.

Therefore, as in the case of the previously mentioned 4 lines/mm scanning line density, when the image signal j output from the OR gate OR2 is taken out by the sampling pulse S during the data effective period in which the data effective signal r is set at the "L" level, and is then input to a buffer memory (not shown), an image signal t for 32 bits in the subscanning direction corresponding to the 8 lines/mm scanning line density can be obtained succeedingly at each main scanning position.

In the above-mentioned embodiment, in order to obtain the image information of 4 lines/mm scanning line density, the image information for 32 bits in the subscanning direction is obtained from the logic sum of odd number image information and even number image information of the image information output from the reading head. However, the present invention is not limited to this. For example, by performing logic processing with respect to an odd number image information and each even number information before and after the odd number image information to take out an image information for one bit, the image information for 32 bits in the subscanning direction can be obtained. In that case, the logic processing can be designed as desired.

What is claimed is:

1. An image information reading system capable of taking out the image information corresponding to a selected scanning line density comprising:
   a reading head for reading image information comprising N light receiving elements arranged substantially in the subscanning direction;
   a first image information abstracting means for abstracting image information for the N/n consecutive bits from predetermined bits in N bits of image information read by said reading head where n is a integer of 2 or more;
   a second image information abstracting means for deriving N/n bits of image information by combining every n consecutive bits of information for N bits read by said reading head;
   a scanning line density setting means which selects either said first image information abstracting means or said second image information abstracting means; and
   an original transfer means, when said first image information abstracting means is selected, which moves the original document relative to said reading head by 1/n of the subscanning movement distance in the case of the selection of said second image information abstracting means.

2. An image information reading system as claimed in claim 1, wherein said first image information abstracting means comprises means capable of obtaining the image information for the first N/n consecutive bits from the image information.

3. An image information reading system as claimed in claim 1, wherein said second image information abstracting means comprises means capable of obtaining N/n bits of image information by subjecting every n consecutive bits of image information to logic processing, which n consecutive bits of image information are taken from N bits of image information read by said reading head.

4. An image information reading system as claimed in claim 1, wherein said second image information abstracting means comprises means capable of obtaining N/n bits of image information by subjecting every three consecutive bits of image information to logic processing, which three consecutive bits of image information are taken from N bits of image information read by said reading head.

5. An image information reading system as claimed in claim 1, wherein said reading head is a head for reading the original document for use with a facsimile transmission apparatus and the abstracting operation of said first and second image information abstracting means is conducted at predetermined sampling intervals.

6. An image information reading system as claimed in claim 3, wherein said logic processing is performed by a logic summation means.

* * * * *